United States Patent [19]

Nachenberg

[11] Patent Number: 6,021,510
[45] Date of Patent: Feb. 1, 2000

[54] ANTIVIRUS ACCELERATOR

[75] Inventor: Carey Nachenberg, Northridge, Calif.

[73] Assignee: Symantec Corporation, Cupertino, Calif.

[21] Appl. No.: 08/977,408

[22] Filed: Nov. 24, 1997

[51] Int. Cl.$^7$ .................................................. G06F 11/00
[52] U.S. Cl. ................................ 714/38; 714/25; 714/48; 714/45; 714/46; 713/200; 380/4
[58] Field of Search .................................. 714/38, 48, 45, 714/46, 33, 2, 25; 395/704; 380/4; 713/200

[56] References Cited

U.S. PATENT DOCUMENTS

| | | | |
|---|---|---|---|
| 5,440,723 | 8/1995 | Arnold et al. | 714/38 |
| 5,452,442 | 9/1995 | Kephart | 714/38 |
| 5,473,769 | 12/1995 | Cozza | 395/183.15 |
| 5,502,815 | 3/1996 | Cozza | 714/38 |
| 5,509,120 | 4/1996 | Merkin et al. | 714/46 |
| 5,572,590 | 11/1996 | Chess | 380/4 |
| 5,649,196 | 7/1997 | Woodhill et al. | 714/1 |
| 5,696,822 | 12/1997 | Nachenberg | 714/38 |
| 5,765,030 | 6/1998 | Nachenberg et al. | 714/38 |
| 5,822,517 | 10/1998 | Dotan | 714/38 |
| 5,826,013 | 10/1998 | Nachenberg | 714/33 |

OTHER PUBLICATIONS

Cohen, Fred, "A Cryptographic Checksum For Integrity Protection", *Computers & Security*, vol. 6, 1987, pp. 505–510, Netherlands.

Williams, Ross N., "Data Integrity with Veracity", Sep. 12, 1994, pp. 1–13, retrieved from the Internet by the International Searching authority via ftp://ftp.rocksoft.com/clients/rocksoft/papers/vercty10.ps, on Mar. 16, 1999; therefore, the date of publication is unknown.

Schneier, Bruce, *Applied Cryptography* 2d ed. (John Wiley & Sons, Inc.), 1996 Chapter 18, pp. 429–459, U.S.A.

*Primary Examiner*—Robert W. Beausoliel, Jr.
*Assistant Examiner*—Wasseem H. Hamdan
*Attorney, Agent, or Firm*—Fenwick & West LLP

[57] ABSTRACT

System and method for examining a file (1) associated with a digital computer (2) to determine whether a computer virus is present within the file (1). The file (1) contains at least one numbered sector. When the file (1) is examined for an initial time, the file (1) is scanned by an antivirus module (3, 5). At that time, the numbers of the sectors being scanned and a hash value for each scanned sector are stored into a critical sector file (4). The hash values can be calculated by an antivirus accelerator module (5). When the file (1) is examined a subsequent time, all of the file (1) sectors that were scanned the initial time are examined by the antivirus accelerator module (5). Each of these sectors again has its hash value calculated and compared with the hash value of the corresponding sector as stored within the critical sector file (4). When any calculated hash value fails to match a corresponding stored hash value for any sector, the antivirus scan module (3) is commanded to rescan the entire file (1)

11 Claims, 3 Drawing Sheets

ANTIVIRUS ACCELERATOR

TECHNICAL FIELD

This invention pertains to the field of detecting viruses in computer software.

BACKGROUND ART

There are several techniques of the prior art that have been used to increase the speed of scanning computer files by antivirus software.

For example, the software product known as Norton AntiVirus (NAV) manufactured by Symantec Corporation runs continuously in the background of a processor. If a file is modified, it is automatically rescanned by NAV. The NAV server-based antivirus software keeps a cache of files that have been scanned and certified clean (virus-free) since the last reboot of the server. If such a file is later accessed by the user, NAV does not rescan the file, since NAV knows that the file is already clean. Such a technique works well for servers, because servers are rarely rebooted and the same files are used over and over again. However, on desktop (client) computers that are reset frequently, such a cache cannot be maintained for long periods, because desktop computers are rebooted frequently. Furthermore, desktop computers typically contain a relatively low amount of memory.

In a second technique of the prior art, desktop based antivirus programs, such as IBM's AntiVirus, store hash data for each program on the hard drive to speed up scanning operations. Once a file is scanned, a hash value (or simply "hash") of the contents of the file is stored in a database. The hash value is a contraction of the file contents created by a hash function, which may or may not be specifically tailored to the type of the file. Hash functions are described in Schneier, Bruce, *Applied Cryptography* 2d ed. (John Wiley & Sons, Inc.), Chapter 18, pp. 429–460, U.S.A.

A hash function is a many-to-one function, i.e., more than one file configuration can have the same hash value, although this is highly unlikely. In this prior art technique, during subsequent scans of the file, the hash of the file is first computed by the antivirus software, and if the computed hash matches the hash stored in the database, the file is certified clean by the antivirus software without the necessity for a rescan. This is possible because a match shows, with a high degree of certainty, that the file has not been modified. This technique eliminates the need for costly CPU-intensive rescans of the file.

Currently, the prior art techniques either take a hash of the entire file or specifically tailor their hash to critical areas of the file based upon the internal file format. If these critical areas change, there is a possibility of viral infection. If the areas do not change, the likelihood of viral infection is reduced and the file is not rescanned.

A second company that has a technology for hashing files on a desktop computer and rescanning them only if the hash values have changed is Sophos Ltd. of the United Kingdom.

DISCLOSURE OF INVENTION

The present invention is a computer-based apparatus and method for examining files (1) associated with a digital computer (2) to determine whether a computer virus is present within said file (1). The file (1) contains at least one numbered sector. An initial time that the file (1) is examined, the file (1) is scanned by an antivirus module (3, 5). The number of each file sector that is scanned and a hash value of each sector that is scanned are stored into a first storage area (4). When the file (1) is examined a subsequent time, all of the file (1) sectors that were scanned the initial time the file (1) was examined are examined by the antivirus accelerator module 5). A hash value for each file (1) sector so examined is computed and compared with the hash value for the corresponding sector that is stored within said first storage area (4). When any computed hash value fails to match a corresponding stored hash value for any sector, the entire file (1) is rescanned by the antivirus scan module (3).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

There is a trend for antivirus scanning to become more CPU-bound and less IO-bound. This is because of the popularity of CPU intensive antivirus techniques such as emulation. Because of this trend, it is advantageous to scan files once and to store relevant information about the files, including a hash value of the file, in a database. The next time the file is scanned, its hash value is looked up in the database and matched against the current hash value for that file. If the hash values match, the file need not be rescanned. This is an effective way to eliminate redundant scanning for at least some machines, including servers. However, this technique has two major flaws:

1. Computing a hash value for the entire file may take longer than an actual antivirus scan for that file, particularly with larger files (such as documents and spreadsheets) that may harbor viruses.

2. If one wishes to compute a hash value for just part of the file in order to speed performance, one has to specifically design parsing and hashing code for each of the major file formats being scanned. For example, NAV currently contains hashing code for .com and .exe files. For DOS .exe files, NAV computes a hash value from the entry point and header, since this is the most likely location of a viral infection. However, Word for Windows document files (in the OLE and .doc formats) do not have an entry point per se. An antivirus engineer would have to build another parser and hasher for OLE and .doc file formats to properly hash relevant sections of the file to check for viruses. To hash for Excel viruses, one would have to build yet another parser and hasher. A parser is first needed, because the parser can distinguish between critical portions of a file, e.g., distinguish between executable code and data. After the parser has determined what are the critical portions of the file for purposes of antivirus protection, a hasher can be built to create the hash value based upon the critical portions of the file.

The present invention overcomes the disadvantages of the prior art, by offering the following:

1. A technique that yields the security of a full file hash while requiring a hash to be taken on only a minimal set of sectors from the file in question.

2. A technique which does not require additional programming of a parser and hasher every time a new virus-hosting file format (such as .com, .exe, .doc, .xls, PowerPoint, etc.) is released.

Figure 1:
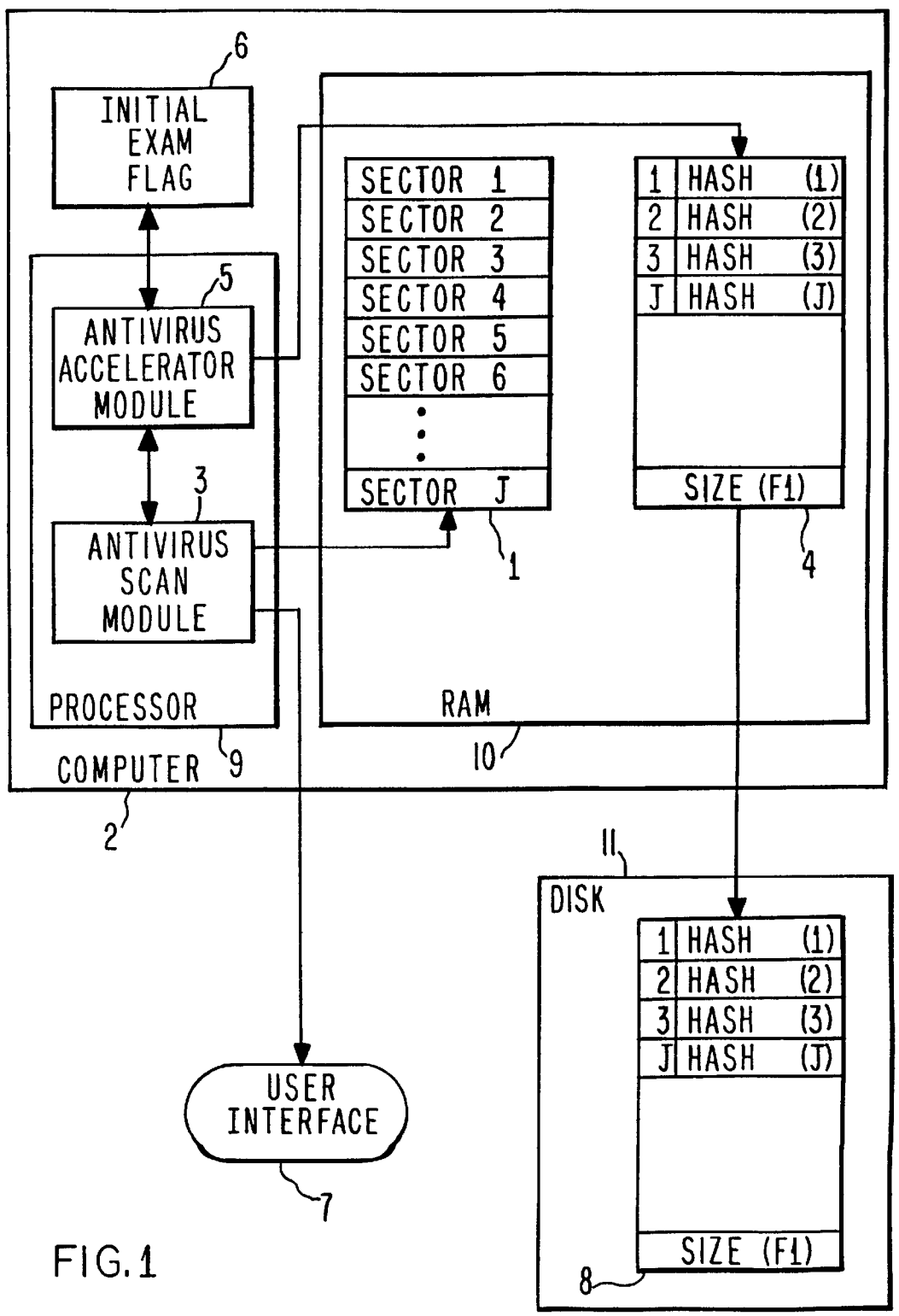
FIG. 1 is a system block diagram illustrating a preferred embodiment of the present invention.
Figure 2:
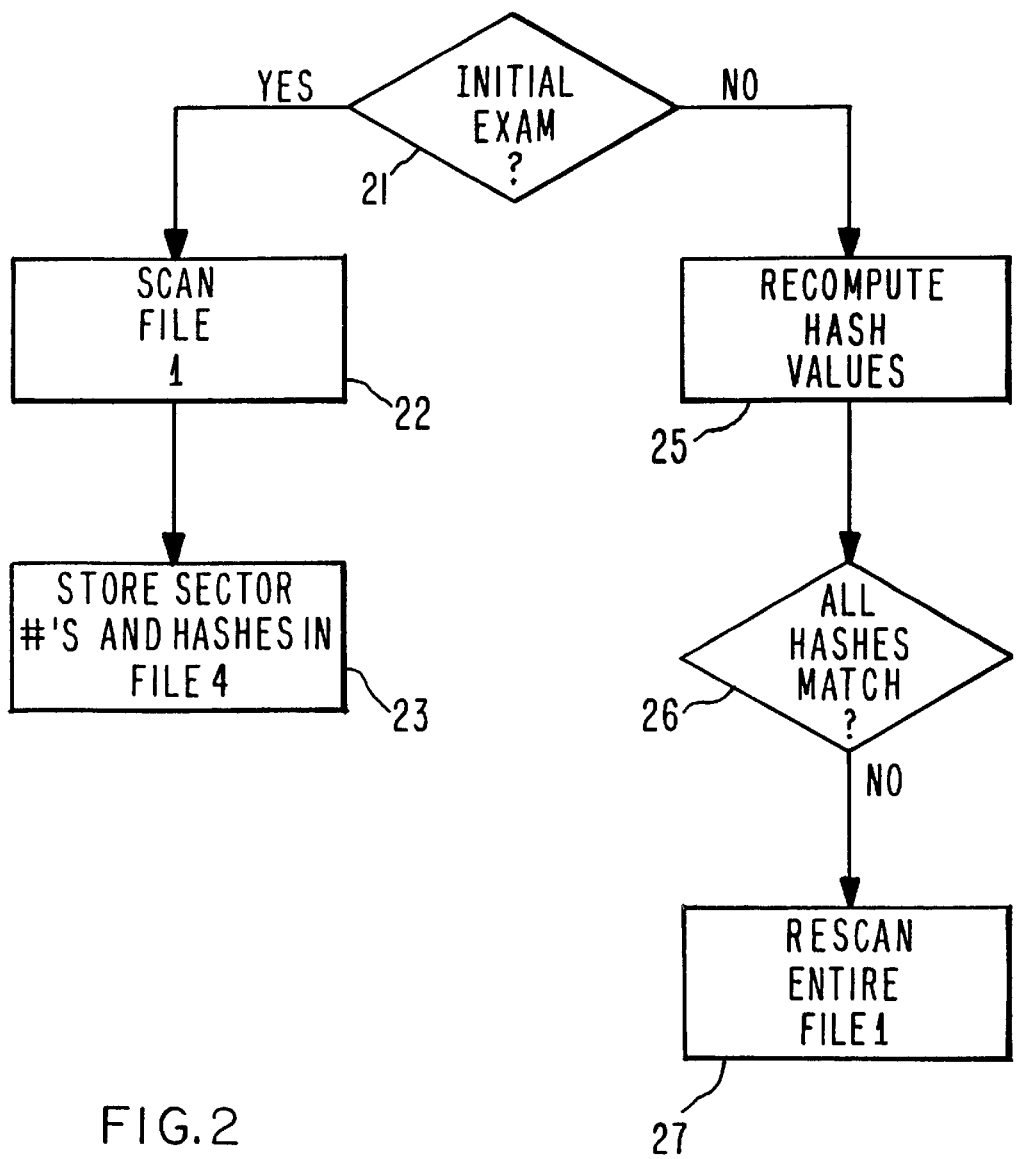
FIG. 2 is a simplified flow diagram illustrating the present invention.
Figure 3:
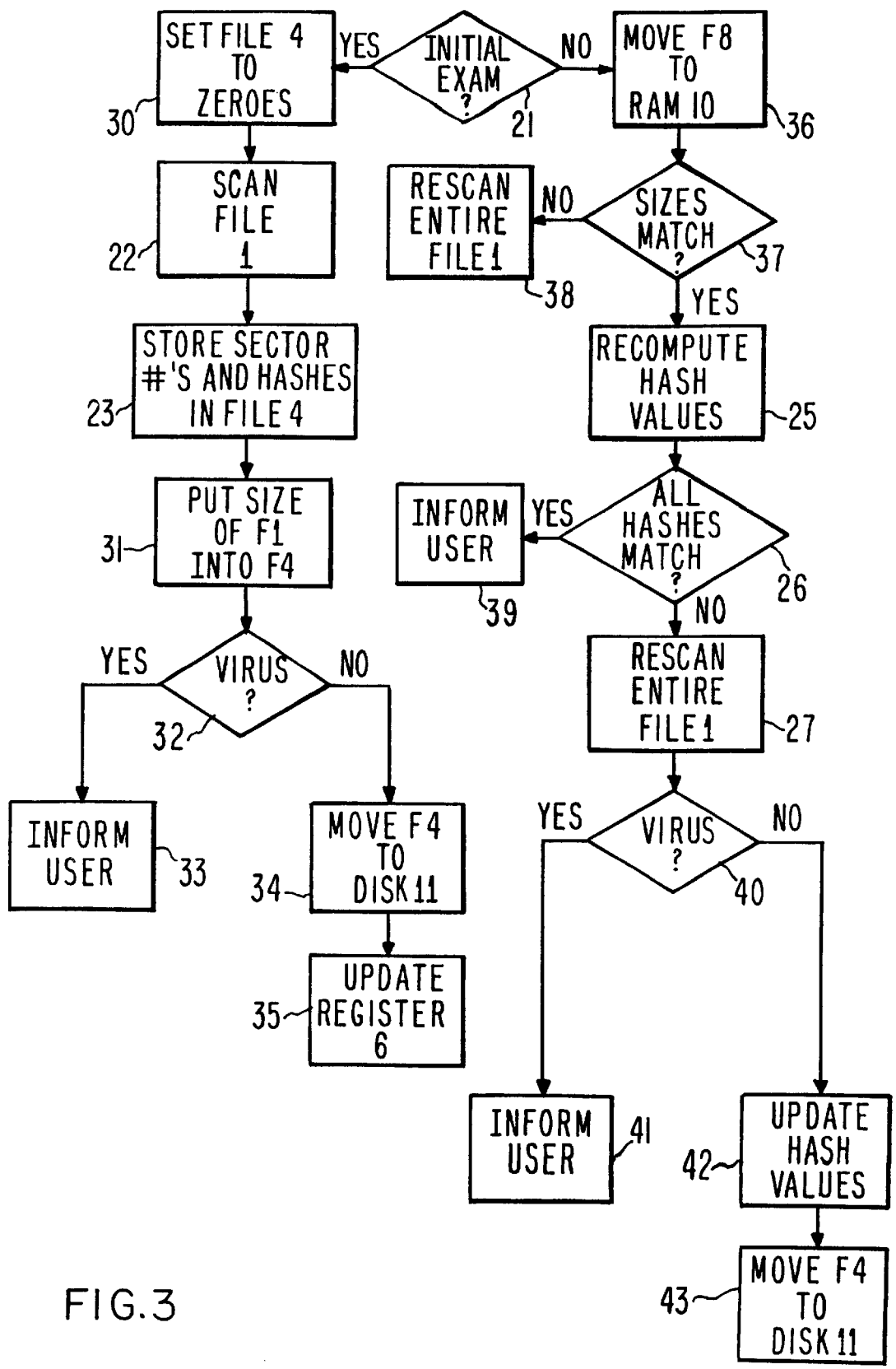
FIG. 3 is a detailed flow diagram illustrating a preferred embodiment of the present invention.

The operation of the present invention will now be described in conjunction with the Figures. A file 1 is to be examined to determine whether or not it contains a virus. File 1 is associated with a digital computer 2. FIG. 1 illustrates file 1 as being within computer 2, e.g., file 1 resides within RAM (random access memory) 10 within computer 2. File 1 could originally have been on a hard disk, floppy disk, or any other computer readable medium, and could be (partially or totally) brought into RAM 10 before it is acted upon by the antivirus modules 3, 5.

Antivirus scan module 3 can be a conventional antivirus product such as Norton AntiVirus (NAV). FIG. 1 illustrates a separate antivirus accelerator module 5 as performing most of the tasks of the present invention. Alternatively, modules 3 and 5 could be combined into one module and just as readily perform the tasks of the present invention; or many or most of these features could be grafted onto module 3.

Modules 3 and 5 are typically embodied as computer programs, executable by a processor 9 within computer 2. Alternatively, modules 3 and 5 could be firmware and/or hardware modules or any combination of software, firmware, and hardware.

File 1 is divided into sectors. There could be just one sector. FIG. 1 illustrates file 1 as having an integral number J of sectors.

The apparatus of the present invention operates differently depending upon whether file 1 is being examined an initial time or a subsequent time.

As used in the present specification and claims, "examined an initial time" means:

1. File 1 is being examined for the very first time ever;
2. File 1 is being re-examined after it has been determined that the contents of file 1 have changed;
3. A virus definition within antivirus scan module 3 has changed; or
4. An antivirus scanning engine within antivirus scan module 3 has changed.

As used in the present specification and claims, "examined a subsequent time" means that file 1 is being examined other than for an initial time, as "initial time" has been defined above.

The information as to whether file 1 is being scanned an initial time can be conveyed to antivirus accelerator module 5 by means of a flag set within initial examination register means 6 stored within computer 2 (step 21). As used in this specification and claims, a "register means" is any device, module, or technique used to store information that changes over time. Thus, "register means" includes hardware, software, and/or firmware registers, stacks, flags, automata, indication bits, etc.

The following steps are performed when register means 6 informs module 5 that file 1 is being scanned for an initial time:

1. The contents of critical sector file 4 are set to zero (step 30). File 4 is in any storage area separate from file 1, and is typically located in RAM 10 to maximize speed.
2. Antivirus scan module 3 is invoked to scan file 1 in the normal manner (step 22). Depending upon the scanning engines within module 3, less than all of the sectors of file 1 may be scanned, or all the sectors may be scanned.
3. During the scanning of file 1, module 5 places into critical sector file 4 the number of each of the sectors that is scanned (step 23). Alternative to module 5 performing this task as illustrated in FIG. 1, this can be done automatically every time a sector is read from file 1 via hooks attached to read and seek functions of the engines within antivirus scan module 3. As each sector is operated upon by module 3, module 5 calculates the hash value for that sector, and inserts the hash value into file 4 (also step 23). FIG. 1 illustrates the special case where four sectors are scanned, namely sectors 1, 2, 3, and J.
4. Module 5 determines the size of file 1 and places this value into file 4 (step 31).
5. If a virus is detected by module 3 (step 32), module 3 typically informs the user, by sending a message to the user via user interface 7, e.g., a monitor (step 33). If, on the other hand, module 3 does not detect a virus in file 1 (step 32), module 5 causes file 4 to be moved to a relatively more permanent location, such as hard disk 11, where file 4 becomes known as remote critical sector file 8 (step 34).
6. Module 5 updates the contents of register means 6 to indicate that file 1 has been examined (step 35).

A subsequent time that file 1 is examined, module 5 checks the contents within register means 6 (step 21). This time, module 5 is informed that file 1 has already been examined an initial time. Therefore, the following set of steps are performed:

1. Module 5 causes remote critical sector file 8 to be moved from disk 11 to RAM 10, where file 8 is again known as critical sector file 4 (step 36).
2. Module 5 determines the size of file 1, and compares this determined size versus the size of file 1 that has been previously stored in file 4 (step 37). If these two numbers are different, then module 5 concludes that the contents of file 1 have changed in some way, and commands module 3 to rescan the entire file 1 for viruses (step 38), commencing with step 30, as described above.
3. If the determined size of file 1 equals the prestored value of the size of file 1 as stored within file 4, then module 5 determines from file 4 what file 1 sectors have previously been scanned. Module 5 then computes the hash values for each of those prescanned sectors (step 25), and compares the computed hash values against the prestored (in file 4) hash values, respectively (step 26).
4. If all of the recently computed hash values are respectively identical to all of the prestored hash values, then module 5 makes the determination that file 1 is "unchanged in a way that could allow for a viral infection". This determination can be sent to the user via user interface 7 (step 39).
5. If any computed hash value fails to match its corresponding prestored hash value for that sector, then module 5 commands module 3 to rescan the entire file 1 for viruses (step 27). If a virus is detected (step 40), the user can be informed as before (step 41). If module 3 fails to detect the presence of a virus within file 1 (step 40), the most recently computed hash values for the scanned sectors are inserted into file 4 (step 42). Then file 4 is moved to disk 11 where it becomes file 8 (step 43).

Any time any change is made to antivirus scan module 3, such as putting in new virus definitions or changing the scanning engines, file 1 must be rescanned for viruses. In such a case, the contents of file 8 are deemed to be invalid, and register means 6 is updated to indicate that file 1 has not been initially examined. Thus, step 30 will be entered, as described above.

The present invention overcomes the two flaws of the prior art, for the following reasons:

1. With respect to scanning and hashing a minimal set of sectors in file 1, the present invention calculates hash values for only those sectors actually retrieved by module 5. Module 3 is deterministic, i.e., it always acts in the same way with the same file 1. Therefore, module 3 always scans the same set of sectors, unless file 1 changes in length or the contents of those sectors have changed in some way. If a sector which is not in the set of sectors retrieved from file 8 has changed, module 3 is oblivious to that fact. But that is of no import to the present invention, because module 3 never scanned that sector to begin with. Module 3 will always detect all of the viruses that it currently knows how to detect, by looking only at the critical fixed set of sectors that has been stored in files 4 and 8.

For example, let us assume that the scanning engines within module 3 virus-scan sectors 1, 3, and 10 from a file 1 of size 10K. If a change were made to either sectors 1, 3, or 10, module 3 would notice the change, since it reads and scans these three sectors. Thus, file 1 would definitely need to be rescanned. However, if a change were made to another sector, say sector 5, and the size of file 1 did not change, none of the scanning engines would have detected nor cared about this change. This would be outside the set of sectors that must be examined to detect a virus according to the current scanning engines with their current set of data. A new version of module 3 might check for sectors 1, 3, 5, and 10. At that time, file 1 would be scanned anew, and a virus in sector 5 would be detected.

2. With respect to the prior art flaw of requiring additional programming of parsers and hashers to support new file formats, the antivirus accelerator module 5 of the present invention automatically hashes all sectors scanned by module 3 in the same way, regardless of the contents of the sectors. No new parser or hasher coding needs to be performed and incorporated into module 5 to support new file formats. Once a new scanning engine is incorporated into module 3, file 1 is scanned anew, as discussed above. From this point on, the old scanning engines scan the original set of sectors, for example 1, 3, and 10, and the new scanning engine scans new sectors, say 5 and 6. Critical sector file 4 then contains information for sectors 1, 3, 5, 6, and 10, and the invention works as before.

Using prior art techniques, the antivirus developer would have to actually build a parser module to specifically traverse the file having the new format, then hash the information in a way that is specifically attuned to that particular file format, an expensive and time consuming process. With the present invention, once the developer has built a new scan module 3, the hashing of the relevant sectors is done automatically whenever the relevant sectors are reloaded into file 4.

The above description is included to illustrate the operation of the preferred embodiments, and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer-based method for examining a file associated with a digital computer, said file containing a plurality of file sectors, to determine whether a computer virus is present within said file, the method comprising the steps of:

when the file is being examined an initial time:

scanning selected file sectors of the file by an antivirus module, the selected file sectors being fewer than all of the file sectors and defining a critical fixed set of sectors; and storing into a first storage area the number of each file sector that is scanned and a hash value of each sector that is scanned; and when the file is being examined a subsequent time:

computing a hash value only for each file sector in the critical fixed set of sectors;

comparing each computed hash value with the hash value stored within said first storage area for the corresponding sector; and rescanning the file by the antivirus module when any computed hash value fails to match a corresponding stored hash value for any sector in the a critical fixed set of sectors.

2. The method of claim 1 comprising the additional step of setting the entire contents of the first storage area to zero before the file is examined for the initial time.

3. The method of claim 1 wherein, during the initial examination of the file, the sector numbers are automatically read into the first storage area by means of hooks associated with engines of the antivirus module.

4. The method of claim 1 wherein, during the initial examination of the file, the antivirus module determines the size of the file and stores said size within the first storage area.

5. The method of claim 4 wherein, during subsequent examinations of the file, the size of the file is computed, and when the computed file size differs from the file size stored in the first storage area, the entire file is scanned for viruses by the antivirus module.

6. The method of claim 1, wherein the steps associated with a subsequent examination of the file are performed whenever the size of the file has not changed since the initial examination of the file.

7. The method of claim 1, wherein, when the computed hash values respectively match all of the corresponding stored hash values, the antivirus module declares that the file is unchanged in a way that could allow for a viral infection.

8. The method of claim 1, wherein, when the antivirus module fails to detect a virus in the file during the initial examination of the file, the contents of the first storage area are moved to a second storage area more permanent than the first storage area.

9. The method of claim 8, wherein, during a subsequent examination of the file, hash values that are computed by the antivirus module are compared with contents of said second storage area.

10. The method of claim 8, wherein, when the antivirus module is changed, the contents of the second storage area are deemed to be invalid and the file is reexamined for viruses.

11. Apparatus for speeding detection of computer viruses, the apparatus comprising:

a first file associated with a digital computer and containing a plurality of numbered sectors;

coupled to the first file, an antivirus scan module adapted to detect the presence of computer viruses only within selected file sectors of the first file, the selected files sectors being fewer than all of the file sectors and defining a critical fixed set of sectors;

coupled to the antivirus scan module, an antivirus accelerator module;

coupled to the antivirus accelerator module, a register means indicating whether the first file has already been scanned by the antivirus scan module; and a critical sectors file coupled to a module from the group of modules consisting of the antvirus accelerator module and the antivirus scan module, said critical sectors file containing the size of the first file, the number of the sectors from the first file scanned by the antivirus scan module, and a hash value only for each sector in the critical fixed set of sectors.

* * * * *